United States Patent [19]
Koga

[11] Patent Number: 5,530,904
[45] Date of Patent: Jun. 25, 1996

[54] SYSTEM FOR TRANFERRING DATA FROM ONE COMMUNICATION LINE TO ANOTHER USING A MULTIPLEXER FOR SELECTING THE LINES AND TRANSFERRING DATA WITHOUT INTERVENTION OF A MAIN PROCESSOR

[75] Inventor: Yasuyuki Koga, Akishima, Japan

[73] Assignee: Toshiba Corporation, Kanagawa-ken, Japan

[21] Appl. No.: 107,123

[22] Filed: Aug. 17, 1993

[30] Foreign Application Priority Data

Aug. 19, 1992 [JP] Japan .................................. 4-220089

[51] Int. Cl.$^6$ ............................. G06F 13/00; G06F 13/20
[52] U.S. Cl. ......................... 395/872; 395/873; 395/445; 365/189.05; 364/952.1; 364/959
[58] Field of Search ..................... 395/275, 325, 395/425, 872, 873; 365/189.05; 364/952.1, 959

[56] References Cited

U.S. PATENT DOCUMENTS

| | | | |
|---|---|---|---|
| 4,133,028 | 1/1979 | Bernstein | 364/200 |
| 4,491,909 | 1/1985 | Shimizu | 364/200 |
| 4,688,168 | 8/1987 | Gudaitis et al. | 364/200 |
| 5,276,799 | 1/1994 | Rivshin | 395/162 |
| 5,303,354 | 4/1994 | Higuchi et al. | 395/325 |

FOREIGN PATENT DOCUMENTS 5-236179 9/1993 Japan .
5-260085 10/1993 Japan .

*Primary Examiner*—Thomas C. Lee
*Assistant Examiner*—Rehana Perveen Krick
*Attorney, Agent, or Firm*—Finnegan, Henderson, Farabow, Garrett & Dunner

[57] ABSTRACT

A store and forward switching system, typically for use as a facsimile system, has a plurality of communication control units for controlling transmission and reception of data through a plurality of respective communication lines, a multiplexer for transferring data to and from a selected one of the communication control units, a hard disk for storing data, a bulk processor for reading data from the hard disk and writing data in the hard disk, a main processor for controlling the multiplexer, the hard disk, and the bulk processor, and a system bus connected to the multiplexer, the bulk processor, and the main processor. The multiplexer and the bulk processor have first and second data transfer execution units, respectively, for transferring data between the multiplexer and the bulk processor through the data transfer bus without being handled by the main processor. Since data are transferred directly between the multiplexer and the bulk processor, the main processor is freed from a burden which would otherwise be imposed by the transfer of data therethrough, and the data transfer can be effected efficiently. A data transfer bus may be connected to the multiplexer and the bulk processor for transferring data therethrough while allowing the main processor to send and receive various request and response signals through the system bus.

20 Claims, 6 Drawing Sheets

SYSTEM FOR TRANFERRING DATA FROM ONE COMMUNICATION LINE TO ANOTHER USING A MULTIPLEXER FOR SELECTING THE LINES AND TRANSFERRING DATA WITHOUT INTERVENTION OF A MAIN PROCESSOR

BACKGROUND OF THE INVENTION

1. Field of the Invention

The present invention relates to a data storage and exchange system for transferring data such as facsimile messages and images for storage and transmission.

2. Description of the Related Art

Recent data storage and exchange systems for use as facsimile systems, for example, store data such as facsimile messages and images which are received and to be transmitted and transmit and receive the stored data. The data storage and exchange systems are required to have a wide variety of additional functions to meet various demands for convenient, efficient, and safe data transmission and reception. For example, the additional functions include functions to process received data based on information indicative of a source, a destination, a service such as multi-address calling, a password, and a time designated for transmission. Heretofore, these additional functions are performed by a processor which controls the overall operation of a data storage and exchange system. Since the processor undergoes a heavy multi-function burden, it comprises a high-speed, large-scale processor or a plurality of processors connected for parallel processing. Such a processor design is however relatively expensive. Therefore, there has been a demand for a data storage and exchange system which can be controlled by a small-scale processor that is freed from an excessive burden to perform a wide variety of desired multiple functions.

SUMMARY OF THE INVENTION

It is therefore an object of the present invention to provide a data storage and exchange system capable of transferring data for storage and transmission without being handled by a main processor, so that the main processor is freed from a burden which would otherwise be imposed by the transfer of data therethrough.

According to the present invention, there is provided a data storage and exchange system comprising input/output means for receiving data transmitted from an external source and transmitting data to an external destination, storage means for storing data, read/write means for reading data from the storage means and writing data in the storage means, and central control means for controlling the input/output means, the storage means, and the read/write means, the input/output means and the read/write means having respective data transfer execution units for transferring data directly between the input/output means and the read/write means without being handled by the central control means.

According to the present invention, there is also provided a data storage and exchange system comprising a plurality of communication control units for controlling transmission and reception of data through a plurality of respective communication lines, a multiplexer for transferring data to and from a selected one of the communication control units, a hard disk for storing data, a bulk processor for reading data from the hard disk and writing data in the hard disk, a main processor for controlling the multiplexer, the hard disk, and the bulk processor, and a bus connected to the multiplexer, the bulk processor, and the main processor, the multiplexer and the bulk processor having first and second data transfer execution units, respectively, for transferring data between the multiplexer and the bulk processor through the bus without being handled by the main processor.

According to the present invention, there is also provided a data storage and exchange system comprising a plurality of communication control units for controlling transmission and reception of data through a plurality of respective communication lines, a multiplexer for transferring data to and from a selected one of the communication control units, a hard disk for storing data, a bulk processor for reading data from the hard disk and writing data in the hard disk, a main processor for controlling the multiplexer, the hard disk, and the bulk processor, a system bus connected to the multiplexer, the bulk processor, and the main processor, and a data transfer bus connected to the multiplexer and the bulk processor, the multiplexer and the bulk processor having first and second data transfer execution units, respectively, for transferring data between the multiplexer and the bulk processor through the data transfer bus without being handled by the main processor.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
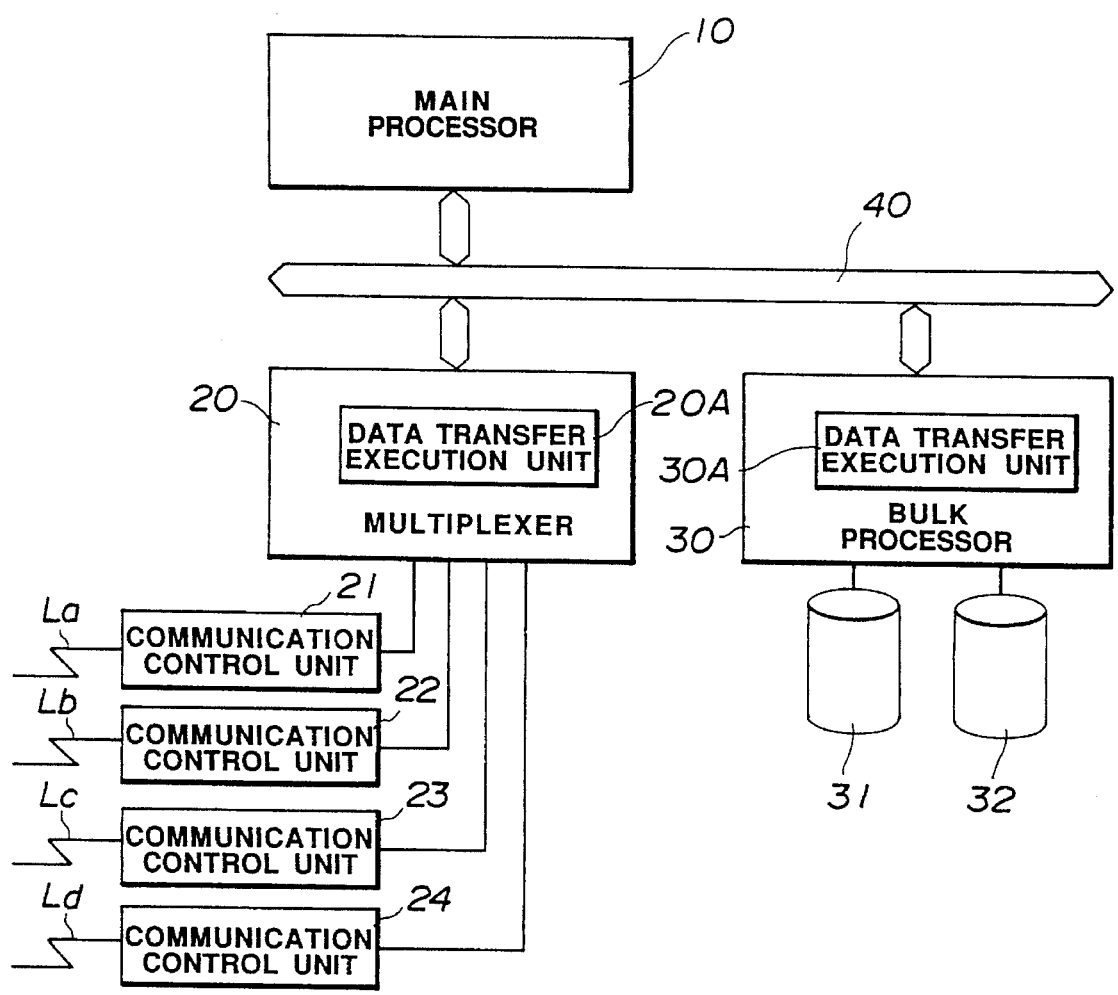
FIG. 1 is a block diagram of a data storage and exchange system according to an embodiment of the present invention.

As shown in FIG. 1, a data storage and exchange system according to an embodiment of the present invention, which is typically used as a facsimile system for storing and exchanging data such as facsimile messages and images, comprises a main processor 10, a multiplexer 20, and a bulk processor 30 which are connected to a system bus 40. The system bus 40 comprises a data bus, an address bus, and a control bus. To the bulk processor 30, there are connected two hard disks 31, 32 for storing data. The multiplexer 20 is connected to a plurality of communication control units 21, 22, 23, 24 which are connected to a public communication line La, a dedicated communication line Lb, and private branch communication lines Lc, Ld for transmitting data to and receiving data from other facsimile systems. As described later on, priority is assigned to the communication lines La, Lb, Lc, Ld such that they are selected successively in the order named.

The multiplexer 20 has a data transfer execution unit 20A, and the bulk processor 30 has a data transfer execution unit 30A. A process of transferring data between the multiplexer 20 and the bulk processor 30 is controlled only by the data transfer execution units 20A, 30A, rather than the main processor 10.

Figure 2:
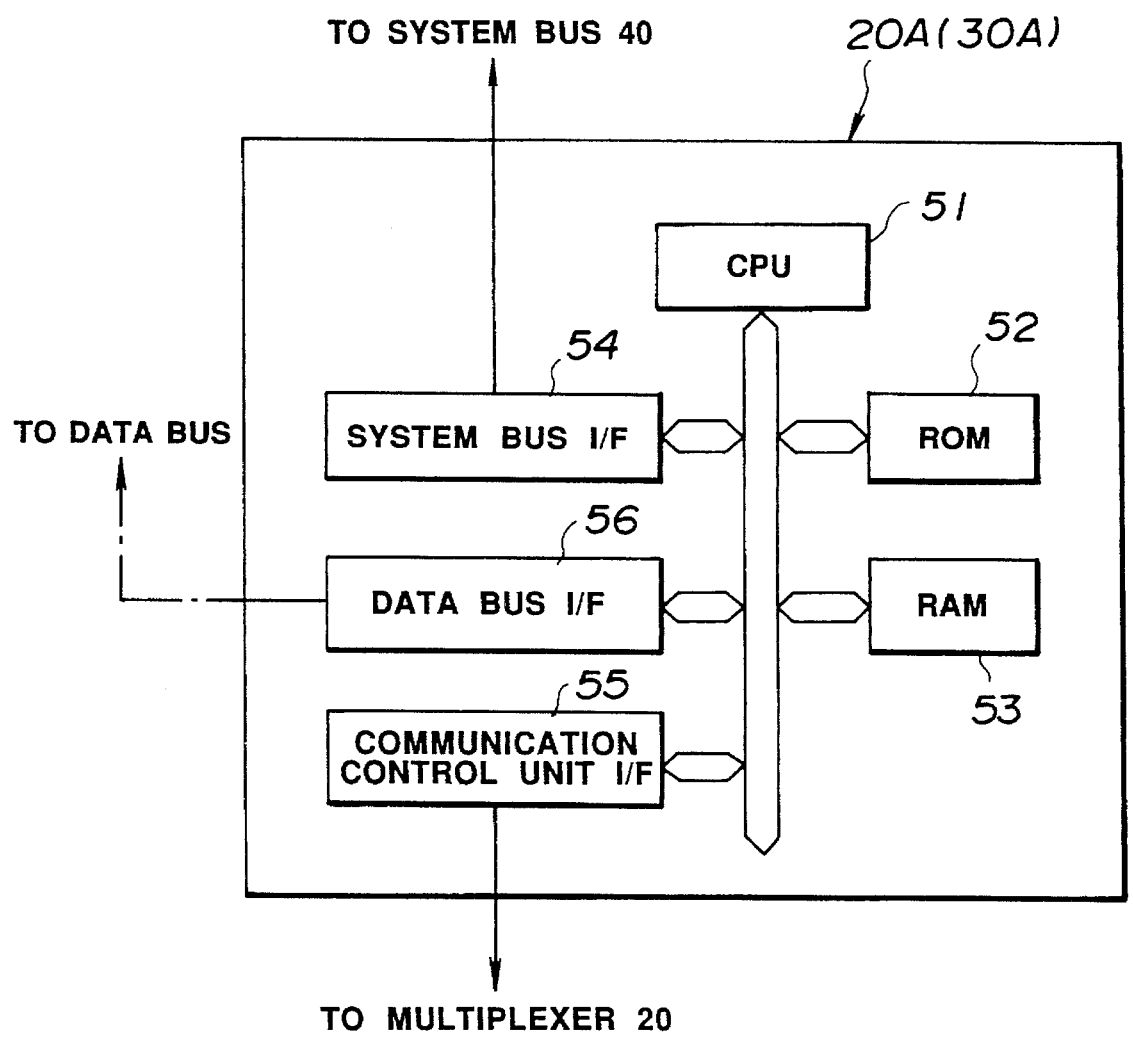
FIG. 2 is a block diagram of a data transfer execution unit in the data storage and exchange system shown in FIG. 1.

The data transfer execution unit 20A is shown in detail in FIG. 2. The data transfer execution unit 30A is structurally identical to the data transfer execution unit 20A, and hence will not be described in detail.

As shown in FIG. 2, the data transfer execution unit 20A comprises a CPU (central processing unit) 51 for controlling various components of the data transfer execution unit 20A, a ROM (read-only memory) 52 for storing a processing program to be executed by the CPU 51, a RAM (random-access memory) 53 for storing a priority table representing priority to select one, at a time, of the communication lines La, Lb, Lc, Ld combined with the respective communication control units 21, 22, 23, 24 when facsimile data are to be transmitted or received. According to the priority table stored in the RAM 53, a priority (1) is assigned to the public communication line La, a priority (2) to the dedicated communication line Lb, a priority (3) to the private branch communication line Lc, and a priority (4) to the private branch communication line Ld. The priority table may be stored in one or both of the RAMs 53 of the data transfer execution units 20A, 30A. If both of the RAMs 53 of the data transfer execution units 20A, 30A store the respective priority tables, then one of the priority tables may be used for the reception of data and the other priority table for the transmission of data, so that data may be transmitted and received in various ways.

The data transfer execution unit 20A also has a system bus interface 54 for receiving data from and transmitting data to the system bus 40, and a communication control unit interface 55 connected to a common terminal of the multiplexer 20 for receiving data from and transmitting data to the communication control units 21, 22, 23, 24. If the data storage and exchange system has a data transfer bus in addition to the system bus 40, then the data transfer execution unit 20A additionally has a data bus interface 56 for receiving data from and transmitting data to the data transfer bus.

Operation of the data storage and exchange system shown in FIGS. 1 and 2 will be described below with respect to reception and transmission of data.

The data storage and exchange system is designed such that control of the system bus 40 is granted by arbitration, i.e., the first and second data transfer execution units 20A, 30A gain access to the system bus 40 for data transfer by arbitration. However, control of the system bus 40 may be granted by time-division multiplexing. If time-division multiplexing is used to share the system bus 40, then control signals are sampled at constant time intervals for character or bit multiplexing in time slots.

Requests for the system bus 40 are accepted by a bus arbiter (not shown), which grants control of the system bus 40 to one of the main processor 10, the multiplexer 20, and the bulk processor 30 at a time.

Figure 3:
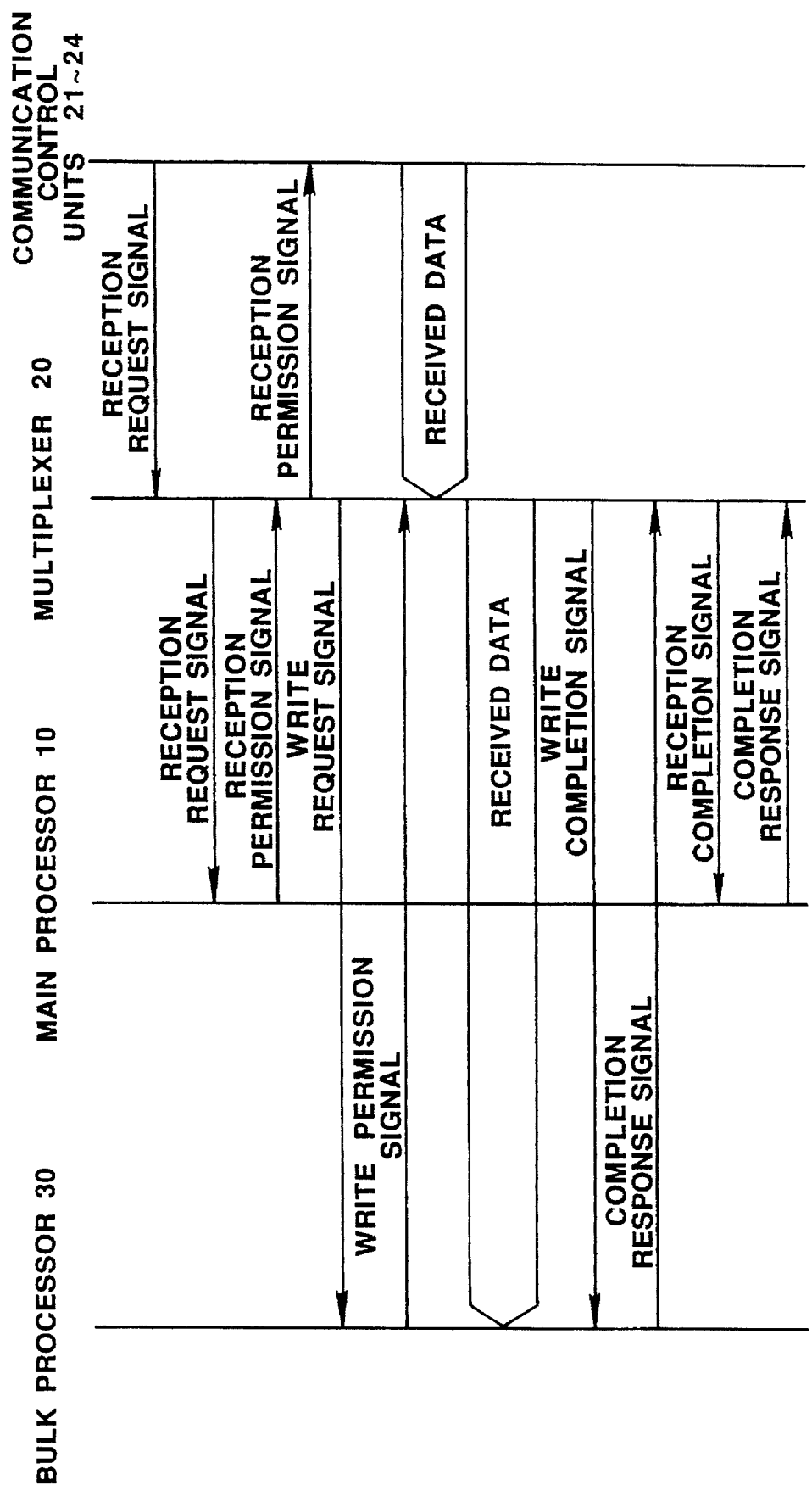
FIG. 3 is a diagram showing a sequence of data reception carried out by the data storage and exchange system.

FIG. 3 shows a sequence of data reception carried out by the data storage and exchange system. In the data reception sequence, incoming data from the communication lines La, Lb, Lc, Ld connected respectively to the communication control units 21, 22, 23, 24 are controlled by the CPU 51 of the data transfer execution unit 20A based on the table stored in the RAM 53. If there are any simultaneous incoming data, then the CPU 51 of the data transfer execution unit 20A responds to the communication lines La, Lb, Lc, Ld in the order of descending priorities. For example, if there are simultaneous incoming data from the communication lines La, Lb, Lc, Ld, the CPU 51 of the data transfer execution unit 20A controls the communication control unit 21 in order to respond to the incoming data from the public communication line La that is given the priority (1).

Now, operation of the communication control unit 21 to receive data will be described below. The other communication control units 22, 23, 24 operate in the same manner as the communication control unit 21. When controlled by the CPU 51 of the data transfer execution unit 20A to process the incoming data from the public communication line La, the communication control unit 21 sends a reception request signal to the multiplexer 20. In response to the reception request signal from the communication control unit 21, the multiplexer 20 sends a reception request signal to the main processor 10. In response to the reception request signal from the multiplexer 20, the main processor 10 gives a reception permission signal to the multiplexer 20. In response to the reception permission signal from the main processor 10, the multiplexer 20 gives a reception permission signal to the communication control unit 21. The request and permission signals are transmitted between the main processor 10 and the multiplexer 20 through the system bus 40 that is controlled by arbitration. Then, the data transfer execution unit 20A of the multiplexer 20 transmits a write request signal through the system bus 40 to the bulk processor 30. The write request signal is accepted by the data transfer execution unit 30A which has been monitoring data destined for the bulk processor 30. The data transfer execution unit 30A sends a write permission signal through the system bus 40 to the multiplexer 20. Having received the reception permission signal from the multiplexer 20, the communication control unit 21 receives facsimile data from the public communication line La that is connected to a facsimile system, and then transmits the received data to the multiplexer 20. The data transfer execution unit 20A of the multiplexer 20 then transfers the received data through the system bus 40 to the bulk processor 30. The data transfer execution unit 30A of the bulk processor 30 accepts the transferred data, and then stores the data in empty areas in the hard disks 31, 32.

When the transfer of all the received data is finished, the data transfer execution unit 20A sends a write completion signal to the bulk processor 30 through the system bus 40, indicating that there are no more data to be transferred. In response to the write completion signal from the data transfer execution unit 20A, the data transfer execution unit 30A of the bulk processor 30 returns a completion response signal to the multiplexer 20 through the system bus 40, declaring the completion of the data transfer. In response to the completion response signal from the bulk processor 30, the multiplexer 20 sends a reception completion signal to the main processor 10. The main processor 10 then returns a completion response signal to the multiplexer 20, confirming the completion of the data reception.

Responsive to the reception request signal, the main processor 10 processes the received data based on information indicative of a source, a destination, a service such as multi-address calling, a password, and a time designated for transmission.

When giving the reception permission signal in response to the reception request signal, the main processor 10 assigns a communication number to the received data. The communication number is given to the multiplexer 20 when it sends the write request signal. The bulk processor 30 sends a record number indicative of the storage area where the data is stored to the multiplexer 20. The multiplexer 20 then sends the record number and the communication number as they are related to each other to the main processor 10.

As described above, data received from one of the communication lines La, Lb, Lc, Ld are transferred from the multiplexer 20 directly to the bulk processor 30 for storage in the hard disks 31, 32, and various signals related to the data storage in the hard disks 31, 32 are also exchanged directly between the multiplexer 20 and the bulk processor 30. Since these data and signals are not handled by the main processor 10, the number of processing steps to be carried out by the main processor 10 is reduced. It is thus possible to increase transfer channels in the main processor 10, and to increase the efficiency of data transfer in the data storage and exchange system. The main processor 10 may be of a relatively small scale, and freed from an excessive burden which would otherwise be imposed by the transfer of data therethrough.

Figure 4:
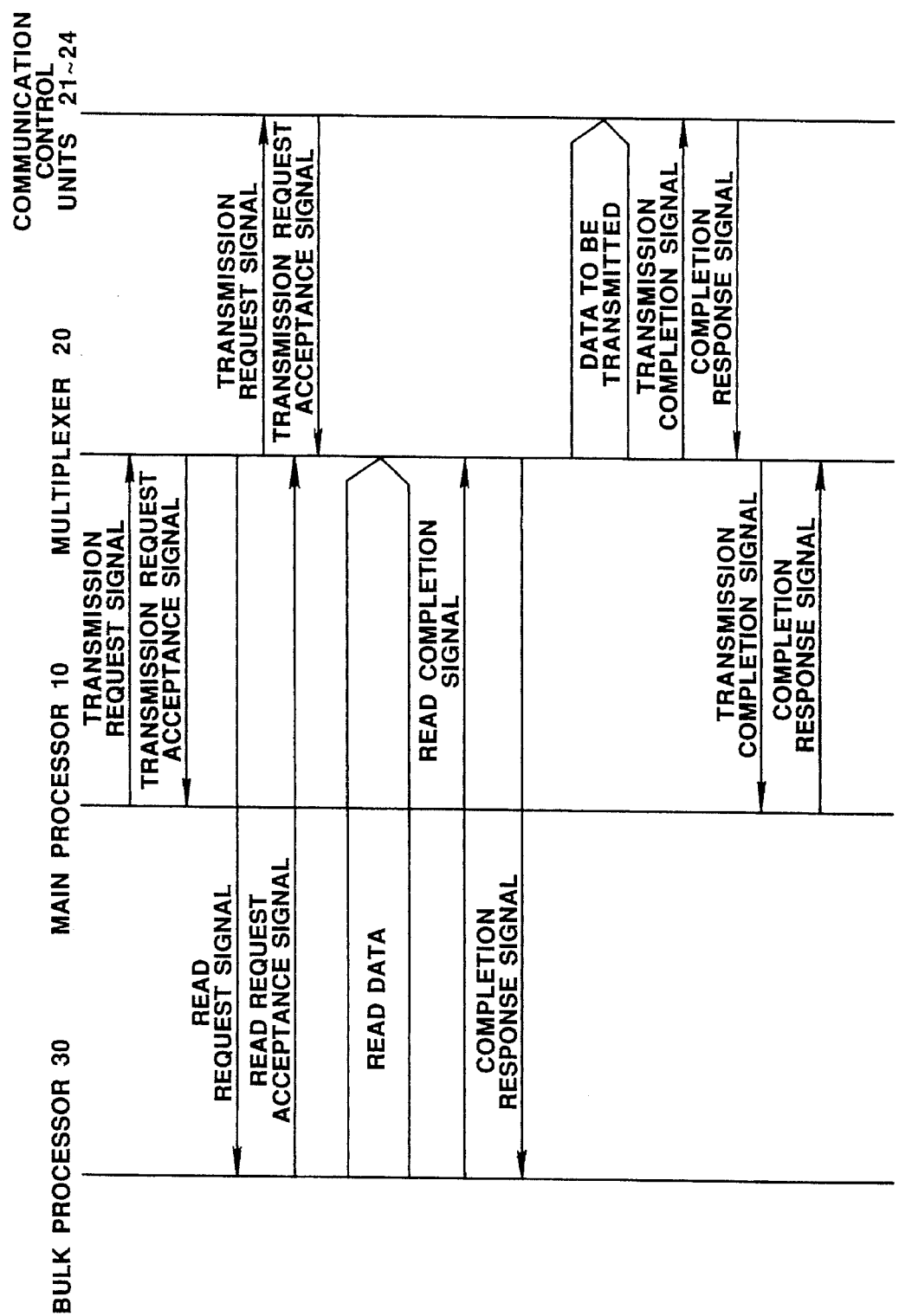
FIG. 4 is a diagram showing a sequence of data transmission carried out by the data storage and exchange system.

FIG. 4 shows a sequence of data transmission carried out by the data storage and exchange system. When a transmission interrupt to transmit data of a certain communication number at a designated time occurs in the main processor 10, the main processor 10 sends a transmission request signal with a record number list to the multiplexer 20 through the system bus 40. In response to the transmission request signal, the multiplexer 20 sends a transmission request acceptance signal to the main processor 10 through the system bus 40.

The data transfer execution unit 20A of the multiplexer 20 sends a read request signal to the bulk processor 30 through the system bus 40. The read request signal is accepted by the data transfer execution unit 30A which has been monitoring data destined for the bulk processor 30. If data can be read from the hard disks 31, 32 by the bulk processor 30, the data transfer execution unit 30A sends a read request acceptance signal to the multiplexer 20 through the system bus 40. At this time, the CPU 51 of the data transfer execution unit 30A controls the multiplexer 20 to determine idle ones of the communication lines La Lb, Lc, Ld connected to the respective communication control units 21 through 24, and to select one of the communication lines La Lb, Lc, Ld based on the priority represented by the table stored in the RAM 53. If the public communication line La with the priority (1) is idle, then data transmission is controlled by the communication control unit 21. If the public communication line La is occupied, then the CPU 51 of the data transfer execution unit 30A controls the multiplexer 20 to successively select the communication lines Lb, Lc, Ld with the respective priorities (2), (3), (4).

Operation of the communication control unit 21 to transmit data will be described below. The other communication control units 22, 23, 24 operate in the same manner as the communication control unit 21. The main processor 10 controls a dial number sending unit to send the dial number of a destination facsimile system to the communication control unit 21. The multiplexer 20 sends a transmission request signal to the communication control unit 21, which then calls the destination facsimile system. When the destination facsimile system answers the call, the communication control unit 21 sends a transmission acceptance signal to the multiplexer 20.

Then, the bulk processor 30 reads data from the hard disks 31, 32 based on a record number contained in the read request signal, and the data transfer execution unit 30A transfer the read data to the multiplexer 20. When the transfer of all the read data is finished, the data transfer execution unit 30A sends a read completion signal to the multiplexer 20 through the system bus 40, indicating that there are no more data to be transferred. In response to the read completion signal from the data transfer execution unit 30A, the data transfer execution unit 20A of the multiplexer 20 returns a completion response signal to the bulk processor 30 through the system bus 40, confirming the completion of the data transfer. The multiplexer 20 sends the received data to the communication control unit 21, which then transmits the data to the destination facsimile system. When the transmission of all the data is completed, the multiplexer 20 sends a transmission completion signal to the communication control unit 21. In response to the transmission completion signal, the communication control unit 21 returns a completion response signal to the multiplexer 20. The multiplexer 20 then sends a transmission completion signal to the main processor 10, which returns a completion response signal to the multiplexer 20, confirming the completion of the data transmission.

As described above, data read from the hard disks 31, 32 are transferred from the bulk processor 30 directly to the multiplexer 20 for transmission through one of the communication lines La, Lb, Lc, Ld, and various signals related to the data readout from the hard disks 31, 32 are also exchanged directly between the bulk processor 30 and the multiplexer 20. Since these data and signals are not handled by the main processor 10, the number of processing steps to be carried out by the main processor 10 is reduced. It is thus possible to increase transfer channels in the main processor 10, and to increase the efficiency of data transfer in the data storage and exchange system. The main processor 10 may be of a relatively small scale, and freed from an excessive burden which would otherwise be imposed by the transfer of data therethrough.

Figure 5:
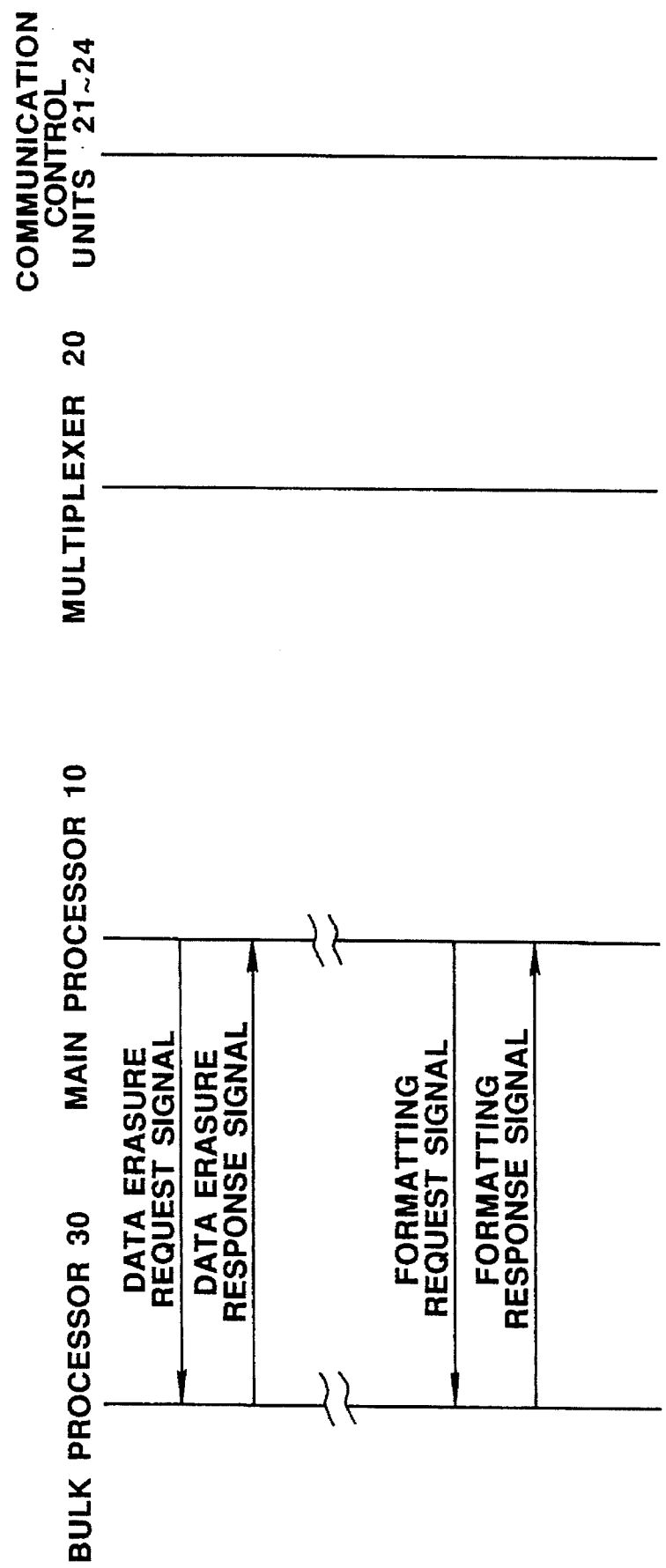
FIG. 5 is a diagram showing a sequence of data erasure and hard disk formatting carried out by the data storage and exchange system.

A sequence of data erasure and hard disk formatting carried out by the data storage and exchange system will be described below with reference to FIG. 5.

When certain data which are no longer necessary are to be erased from the hard disks 31, 32, the main processor 10 sends a data erasure request signal with a record number to the bulk processor 30. In response to the data erasure request signal from the main processor 10, the bulk processor 30 returns a data erasure response signal to the main processor 10, confirming that the data should be erased from the hard disks 31, 32. The bulk processor 30 then erases data from the storage area, indicated by the record number, on the hard disks 31, 32, leaving the storage area available for storing new data.

When it is necessary that the storage areas on the hard disks 31, 32 be formatted again, the main processor 10 sends a formatting request signal to the bulk processor 30. The bulk processor 30 then returns a formatting response signal to the main processor 10, and formats the storage areas on the hard disks 31, 32.

Figure 6:
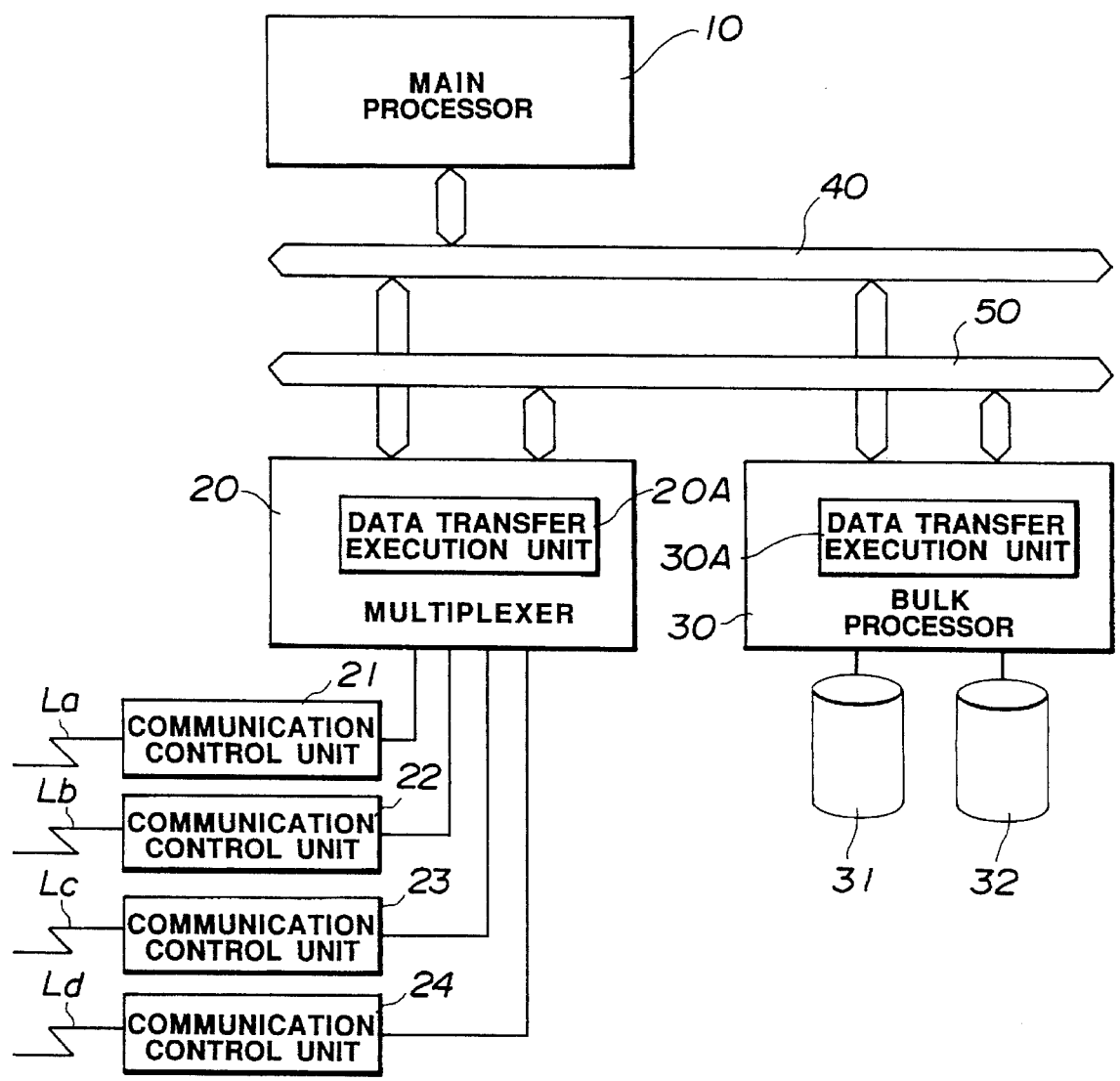
FIG. 6 is a block diagram of a data storage and exchange system according to another embodiment of the present invention.

FIG. 6 shows in block form a data storage and exchange system according to another embodiment of the present invention. The data storage and exchange system shown in FIG. 6 differs from the data storage and exchange system shown in FIG. 1 in that a data transfer bus 50 dedicated for the transfer of data is connected to the multiplexer 20 and the bulk processor 30. The data transfer bus 50 comprises a data bus, an address bus, and a control bus. A bus arbiter (not shown) grants control of the data transfer bus 50 to one of the multiplexer 20 and the bulk processor 30 at a time. The data storage and exchange system shown in FIG. 6 is advantageous in that the main processor 10 can send and receive various request and response signals through the system bus 40 while data are being transferred between the multiplexer 20 and the bulk processor 30 through the data transfer bus 50.

Although certain preferred embodiments of the present invention have been shown and described in detail, it should be understood that various changes and modifications may be made therein without departing from the scope of the appended claims.

What is claimed is:

1. A store and forward switching system that serves a plurality of communication lines and facilitates increasing the number of said communication lines served, said system comprising:

a bus;

a hard disk for storing data received from a first line of said plurality of communication lines awaiting transmission to a second line of said plurality of communication lines;

a plurality of communication control units, each connected to one of said communication lines for controlling transmission to and from said one of said communication lines;

a main processor for controlling said hard disk, a multiplexer, and a bulk processor through communication therewith of control information before and after a transmission and a reception;

said multiplexer responsive to a first control signal from at least one of said communication control units indicating reception of said data for selecting said one of said communication control units that is connected to said first line and connecting said selected one of said communicating control units to said bus, and responsive to a second control signal from said main processor indicating transmission of said data for selecting another one of said communication control units that is connected to said second line and connecting said selected another one of said communication control units to said bus;

said bulk processor for writing said data received on said bus in said hard disk and for reading out said data from said hard disk for transmission on said bus; and first and second data transfer execution units included in said multiplexer and said bulk processor, respectively, for communicating said data with each other through said bus without an intervention of said main processor.

2. The store and forward switching system according to claim 1, wherein said first data transfer execution unit comprises means for transferring said data received from the selected one of said communication control units to said second data transfer execution unit, and said second data transfer execution unit comprises means for storing the transferred data in said hard disk.

3. The store and forward switching system according to claim 2, wherein said main processor comprises means for processing the received data based on information indicative of a source, a destination, a multi-address calling service, a password, and a time designated for transmission.

4. The store and forward switching system according to claim 2, wherein said main processor comprises means for assigning a communication number to the received data and giving the communication number to said multiplexer, said bulk processor comprises means for sending to said multiplexer a record number indicative of a storage area in said hard disk where said data from said first line is stored, and said multiplexer comprises means for sending the record number and the communication number as they are related to each other to said main processor.

5. The store and forward switching system according to claim 1, wherein said second data transfer execution unit comprises means for transferring data read from said hard disk to said first data transfer execution unit, and said first data transfer execution unit comprises means for transmitting the transferred data through said selected another one of said communication control units.

6. The store and forward switching system according to claim 1, wherein said main processor comprises means for sending a data erasure request signal with a record number to said bulk processor, and said bulk processor comprises means responsive to said data erasure request signal for returning a data erasure response signal to said main processor and erasing data indicated by said record number from said hard disk.

7. The store and forward switching system according to claim 1, wherein said main processor comprises means for sending a formatting request signal to said bulk processor, and said bulk processor comprises means responsive to said formatting request signal for returning a formatting response signal to said main processor and formatting said hard disk.

8. The store and forward switching system according to claim 1, wherein each of said first and second transfer execution units comprises a read-only memory for storing a processing program, a random-access memory for storing data, a bus interface for receiving data from and sending data to said bus, a communication control unit interface for receiving and sending said data from said first line from and to said selected one and said selected another one, respectively, of said communication control units, and a central processing unit for controlling said read-only memory, said random-access memory, said bus interface, and said communication control unit interface based on said processing program.

9. The store and forward switching system according to claim 1, wherein at least one of said first and second data transfer execution units has a table representing priority to select one of the communication control units, said at least one of said first and second data transfer execution units comprising means for controlling said multiplexer to select one of the communication control units based on the priority represented by said table.

10. The store and forward switching system according to claim 9, wherein at least one of said first and second data transfer execution units has a random-access memory, said table being stored in said random-access memory.

11. A store and forward switching system that serves a plurality of communication lines and facilitates increasing the number of said communication lines served, said system comprising:

a data transfer bus;

a hard disk for storing data received from a first line of said plurality of communication lines awaiting transmission to a second line of said plurality of communication lines;

a plurality of communication control units, one connected to said first line of said plurality of communication lines and another connected to said second line of said plurality of communication lines, for controlling transmission to and from said plurality of communication lines;

a main processor for controlling said hard disk, a multiplexer, and a bulk processor through communication therewith of control information before and after a transmission and a reception;

said multiplexer connected to said data transfer bus and responsive to a first control signal from at least one of said communication control units indicating reception of said data for selecting said one of said communication control units that is connected to said first line and connecting said selected one of said communicating control units to said data transfer bus, and responsive to a second control signal from said main processor indicating transmission of said data for selecting another one of said communication control units that is connected to said second line and connecting said selected another one of said communication control units to said data transfer bus;

said bulk processor connected to said data transfer bus for writing said data received on said data transfer bus in said hard disk and for reading out said data from said hard disk for transmission on said data transfer bus;

a system bus connected to said multiplexer, said bulk processor, and said main processor for supporting said communication; and first and second data transfer execution units included in said multiplexer and said bulk processor, respectively, for communicating said data with each other through said bus without an intervention of said main processor.

12. The store and forward switching system according to claim 11, wherein said first data transfer execution unit comprises means for transferring said data received from the selected one of said communication control units and said second data transfer execution unit comprises means for storing the transferred data in said hard disk.

13. The store and forward switching system according to claim 12, wherein said main processor comprises means for processing the received data based on information indicative of a source, a destination, a multi-address calling service, a password, and a time designated for transmission.

14. The store and forward switching system according to claim 12, wherein said main processor comprises means for assigning a communication number to the received data and giving the communication number to said multiplexer, said bulk processor comprises means for sending to said multiplexer a record number indicative of a storage area in said hard disk where said data from said first line is stored, and said multiplexer comprises means for sending the record number and the communication number as they are related to each other to said main processor.

15. The store and forward switching system according to claim 11, wherein said second data transfer execution unit comprises means for transferring data read from said hard disk to said first data transfer execution unit, and said first data transfer execution unit comprises means for transmitting the transferred data through said selected another one of said communication control units.

16. The store and forward switching system according to claim 11, wherein said main processor comprises means for sending a data erasure request signal with a record number to said bulk processor, and said bulk processor comprises means responsive to said data erasure request signal for returning a data erasure response signal to said main processor and erasing data indicated by said record number from said hard disk.

17. The store and forward switching system according to claim 11, wherein said main processor comprises means for sending a formatting request signal to said bulk processor, and said bulk processor comprises means responsive to said formatting request signal for returning a formatting response signal to said main processor and formatting said hard disk.

18. The store and forward switching system according to claim 11, wherein each of said first and second transfer execution units comprises a read-only memory for storing a processing program, a random-access memory for storing data, a system bus interface for receiving data from and sending data to said system bus, a communication control unit interface for receiving and sending said data from said first line from and to said selected one and said selected another one, respectively, of said communication control units, a data transfer bus interface for receiving data from and sending data to said data transfer bus, and a central processing unit for controlling said read-only memory, said random-access memory, said system bus interface, said data transfer bus interface, and said communication control unit interface based on said processing program.

19. The store and forward switching system according to claim 11, wherein at least one of said first and second data transfer execution units has a table representing priority to select one of the communication control units, said at least one of said first and second data transfer execution units comprising means for controlling said multiplexer to select one of the communication control units based on the priority represented by said table.

20. The store and forward switching system according to claim 19, wherein at least one of said first and second data transfer execution units has a random-access memory, said table being stored in said random-access memory.

* * * * *

UNITED STATES PATENT AND TRADEMARK OFFICE
CERTIFICATE OF CORRECTION

PATENT NO. : 5,530,904
DATED : June 25, 1996
INVENTOR(S) : Yasuyuki KOGA

It is certified that error appears in the above-indentified patent and that said Letters Patent is hereby corrected as shown below:

On the title page, item [54] and column 1, line 1, "TRANFERRING" should read --TRANSFERRING--.

Signed and Sealed this

Twenty-sixth Day of November 1996

Attest:

BRUCE LEHMAN

Attesting Officer    Commissioner of Patents and Trademarks